United States Patent
Birch et al.

(10) Patent No.: US 8,131,862 B2
(45) Date of Patent: Mar. 6, 2012

(54) INTEGRATION OF SS7 WITH AN APPLICATION SERVER

(75) Inventors: Oliver Birch, Annapolis, MD (US); Can Paul Boyacigiller, Annapolis, MD (US); Sreenivasa Rao Pamidala, Crofton, MD (US); Bouna Sall, Bowie, MD (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 12/409,874

(22) Filed: Mar. 24, 2009

(65) Prior Publication Data

US 2010/0250754 A1 Sep. 30, 2010

(51) Int. Cl.
G06F 15/16 (2006.01)
H04L 12/28 (2006.01)

(52) U.S. Cl. .................................... 709/228; 370/351

(58) Field of Classification Search .................. 709/228; 370/352
See application file for complete search history.

(56) References Cited

U.S. PATENT DOCUMENTS

2005/0251563 A1* 11/2005 Berranger et al. ............ 709/217
2007/0008955 A1* 1/2007 Delaney et al. ............... 370/352

* cited by examiner

Primary Examiner — Jerry Dennison
(74) Attorney, Agent, or Firm — Law Office of Jim Boice (57) ABSTRACT

A computer-implemented method, system and computer-readable storage medium are presented for establishing a communication link between an SS7 device and an application server. An SS7 message is first decoded by a SS7 SIGTRAN gateway into a SIGTRAN message. The SIGTRAN message is sent to a proxy server, wherein the SIGTRAN message is converted into XML for transmission to a converged application in the application server.

22 Claims, 7 Drawing Sheets

INTEGRATION OF SS7 WITH AN APPLICATION SERVER

BACKGROUND OF THE INVENTION

1. Technical Field

The present disclosure relates to the field of computers, and specifically to application servers. Still more specifically, the present invention relates to application servers communicating with telephone networks.

2. Description of the Related Art

An application server is typically part of a distributed service that provides and manages software to clients across multiple computing platforms, often in an on-demand manner. This distributed service typically includes distributed application and web servers that host the software, edge servers that load balance supply and demand of such software, remote servers, application integration and connectivity middleware, process integration infrastructure, networking support, portal and software development support, and other system management services.

Application servers that are part of such a distributed service communicate with clients using protocols from the Internet Protocol (IP) suite, which include HyperText Transfer Protocol (HTTP), Transmission Control Protocol (TCP), Internet Protocol (IP), etc. Typically, however, such application servers are unable to directly communicate with Public Switched Telephone Networks (PSTNs), including those that utilize the Signaling System 7 (SS7) protocol. Thus, if a user/manager/developer of a PSTN wishes to avail his network of software from an application server, there is no seamless and transparent method for accomplishing this.

SUMMARY OF THE INVENTION

To address the above described issue, a computer-implemented method, system and computer-readable storage medium are presented for establishing a communication link between an SS7 device and an application server. An SS7 message is first decoded by a SS7 SIGTRAN gateway into a SIGTRAN message. The SIGTRAN message is sent to a proxy server, wherein the SIGTRAN message is converted into XML for transmission to a converged application in the application server.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
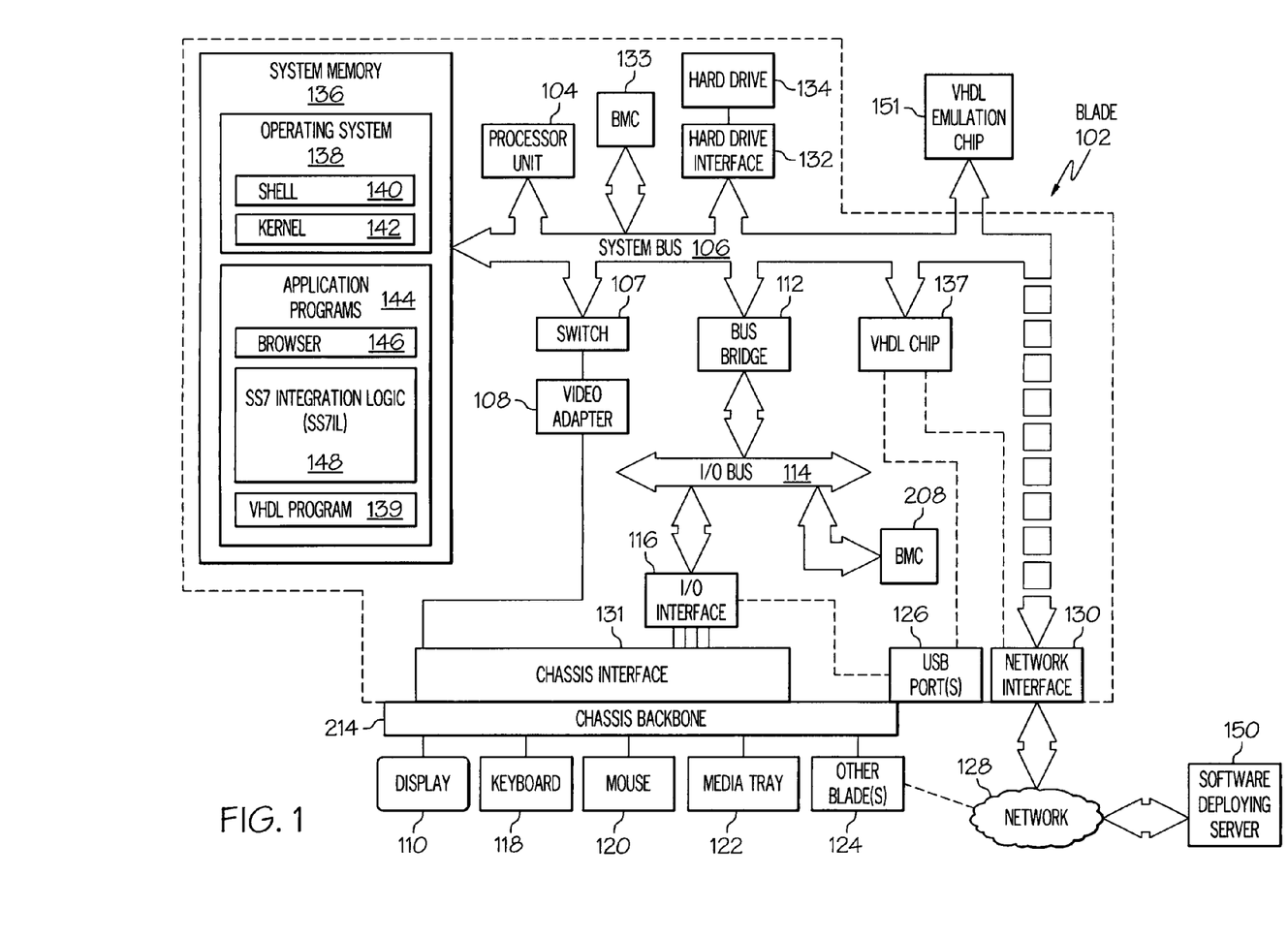
FIG. 1 depicts an exemplary computer blade with one or more specific processors that may be utilized by various components of the present invention.

With reference now to the figures, and in particular to FIG. 1, there is depicted a block diagram of an exemplary blade 102, which may be utilized by the present invention. Blade 102 is a component of a server blade chassis (shown in FIG. 2 as blade chassis 202). Blade chassis 202 is usually utilized as a server; thus, blade 102 may be referenced as a server blade. Note that some or all of the exemplary architecture shown for blade 102 may be utilized by software deploying server 150 and/or other blades 124, which may be within a same blade chassis as blade 102. Furthermore, blade 102 and/or blade chassis 202 may be utilized as the architecture for SS7 SIGTRAN Gateway 302, proxy server 304, and/or application server 306 shown in FIG. 3*a*.

Blade 102 includes a processor unit 104 that is coupled to a system bus 106. Processor unit 104 may utilize one or more processors, each of which has one or more processor cores. A video adapter 108, which drives/supports a display 110, is also coupled to system bus 106 via a chassis interface 131 to a chassis backbone 218 (described in greater detail below). In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional, only upon execution of instructions (e.g., SS7 Integration Logic—SS7IL 148 described below) that perform the method described herein. This switching causes a substantive transformation of the blade 102 from a system in which pending steps and/or results of the herein described method are NOT displayed, into a system in which these results ARE displayed.

System bus 106 is coupled via a bus bridge 112 to an Input/Output (I/O) bus 114. An I/O interface 116 is coupled to I/O bus 114. I/O interface 116 affords communication with various I/O devices either directly or via the chassis interface 131, which is hardware and/or software that allows the blade 102 to be coupled to chassis backbone 214 in a blade chassis 202 (described in further detail in FIG. 2). Once coupled to the chassis backbone 214, the blade 102 is able to communicate with other devices in addition to the display 110, including a keyboard 118, a mouse 120, a media tray 122 (which may include storage devices such as CD-ROM drives, multimedia interfaces, etc.), other blade(s) 124 that are within a blade chassis, and (if a VHDL chip 137 is not utilized in a manner described below), USB port(s) 126. Note that while other blade(s) 124 are shown as being coupled to blade 102 via the chassis interface 131, in one embodiment these other blade(s) 124 can be coupled to blade 102 via network 128, particularly if network 128 is a Local Area Network (LAN) within a blade center. While the format of the ports connected to I/O interface 116 may be any known to those skilled in the art of computer architecture, in a preferred embodiment some or all of these ports are Universal Serial Bus (USB) ports. Also coupled to I/O bus 114 is a Baseboard Management Controller (BMC) 208, which is discussed further below.

As depicted, blade 102 is able to communicate with a software deploying server 150 and, in one embodiment, with other blade(s) 124 within a blade chassis, via network 128 using a network interface 130, which is coupled to system bus 106. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in blade 102. This volatile memory includes additional higher levels of volatile memory (not shown), including, but not limited to, cache memory, registers and buffers. Data that populates system memory 136 includes blade 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a World Wide Web (WWW) client (i.e., blade 102) to send and receive network messages to the Internet using HyperText Transfer Protocol (HTTP) messaging, thus enabling communication with software deploying server 150 and other described computer systems.

Application programs 144 in blade 102's system memory (as well as software deploying server 150's system memory) also include a Signaling System 7 Integration Logic (SS7IL) 148. SS7IL 148 includes code for implementing the processes described below, including those described in FIGS. 3a-c and FIG. 5. In one embodiment, blade 102 is able to download SS7IL 148 from software deploying server 150, including in an on-demand basis. Note further that, in one embodiment of the present invention, software deploying server 150 performs all of the functions associated with the present invention (including execution of SS7IL 148), thus freeing blade 102 from having to use its own internal computing resources to execute SS7IL 148.

Also stored in system memory 136 is a VHDL (VHSIC Hardware Description Language) program 139. VHDL is an exemplary design-entry language for Field Programmable Gate Arrays (FPGAs), Application Specific Integrated Circuits (ASICs), and other similar electronic devices. In one embodiment, execution of instructions from SS7IL 148 causes VHDL program 139 to configure VHDL chip 137, which may be an FPGA, ASIC, etc., from a chip that previously prevented system bus 106 from communicating with USB ports 126 and/or network interface 130, into a chip that allows such communication. Thus, this programming of VHDL chip 137 causes a substantial transformation of the architecture of blade 102, wherein USB port(s) 126 and/or network interface 130 are now selectively coupled to system bus 106 via VHDL chip 137 (assuming that USB port(s) 126 are NOT directly coupled to I/O interface 116, and that network interface 130 is NOT directly coupled to system bus 106).

In another embodiment of the present invention, execution of instructions from SS7IL 148 results in a utilization of VHDL program 139 to program a VHDL emulation chip 151. VHDL emulation chip 151 may incorporate a similar architecture as described above for VHDL chip 137. Once SS7IL 148 and VHDL program 139 program VHDL emulation chip 151, VHDL emulation chip 151 performs, as hardware, some or all functions described by one or more executions of some or all of the instructions found in SS7IL 148. That is, the VHDL emulation chip 151 is a hardware emulation of some or all of the software instructions found in SS7IL 148. In one embodiment, VHDL emulation chip 151 is a Programmable Read Only Memory (PROM) that, once burned in accordance with instructions from SS7IL 148 and VHDL program 139, is permanently transformed into a new circuitry that performs the functions of some or all of the elements found in SS7 SIGTRAN gateway 302, proxy server 304, and/or application server 306 shown below in FIG. 3a. Thus, VHDL emulation chip 151 is also properly viewed as a machine that is under the control of blade 102. Note that while VHDL emulation chip 151 is depicted as being a different entity that is separate from blade 102, in another embodiment VHDL emulation chip 151 may be an integral part of blade 102.

The hardware elements depicted in blade 102 are not intended to be exhaustive, but rather are representative to highlight essential components required by the present invention. For instance, blade 102 may include alternate memory storage devices such as magnetic cassettes, Digital Versatile Disks (DVDs), Bernoulli cartridges, and the like. Similarly, alternate hardware architectures, such as that used in Personal Computer, may be utilized by the present invention. These and other variations are intended to be within the spirit and scope of the present invention.

Figure 2:
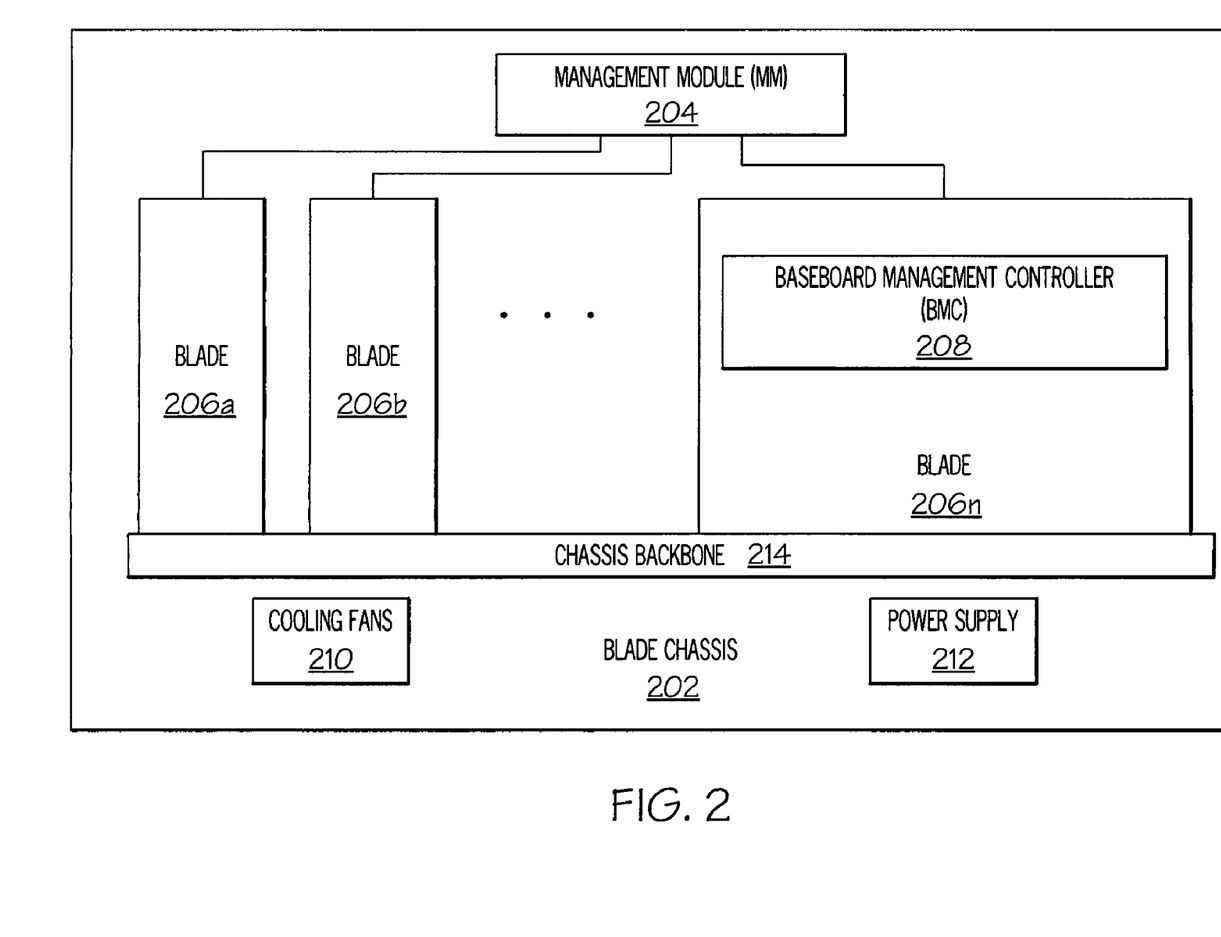
FIG. 2 illustrates additional detail of a blade chassis in which the computer blade shown in FIG. 1 may be incorporated.

Referring now to FIG. 2, an exemplary blade chassis 202, in which the present invention may be implemented, is presented. Within blade chassis 202 are a plurality of blades 206a-n, where "n" is any integer, but is preferably 14. The blades 206a-n (each referenced individually as a set/subset without specificity as 206) are coupled to a chassis backbone 214, which provides mechanical and logical connections (e.g., data and control signal interchange) among the blades 206a-n. Associated with, and preferably mounted on each blade 206, is a separate Baseboard Management Controller (BMC) 208. That is, in a preferred embodiment, each blade 206 has its own unique BMC 208. In an alternate embodiment, multiple blades 206 may share a same BMC 208. In either architecture, BMC 208 is a specialized microcontroller that monitors the overall health and environment of a blade 206. This monitoring includes, but is not limited to, controlling cooling fans 210, adjusting power supply 212 for one or more blades 206, checking on an Operating Status (OS) within a particular blade 206, and then sending warning and alerts regarding anomalies to such monitored activities to an administrator (not shown). In accordance with the present invention, the BMC 208 also monitors a performance of a Management Module (MM) 204, to which a particular blade 206 (e.g., blade 206n) is presently coupled.

MM 204 includes a processor (not shown) for controlling Input/Output (I/O) functions of specific blades 206, interfacing a specific blade with a network (e.g., network 128 shown in FIG. 1), and allocating jobs and data to specific blades 206.

Figure 3A:
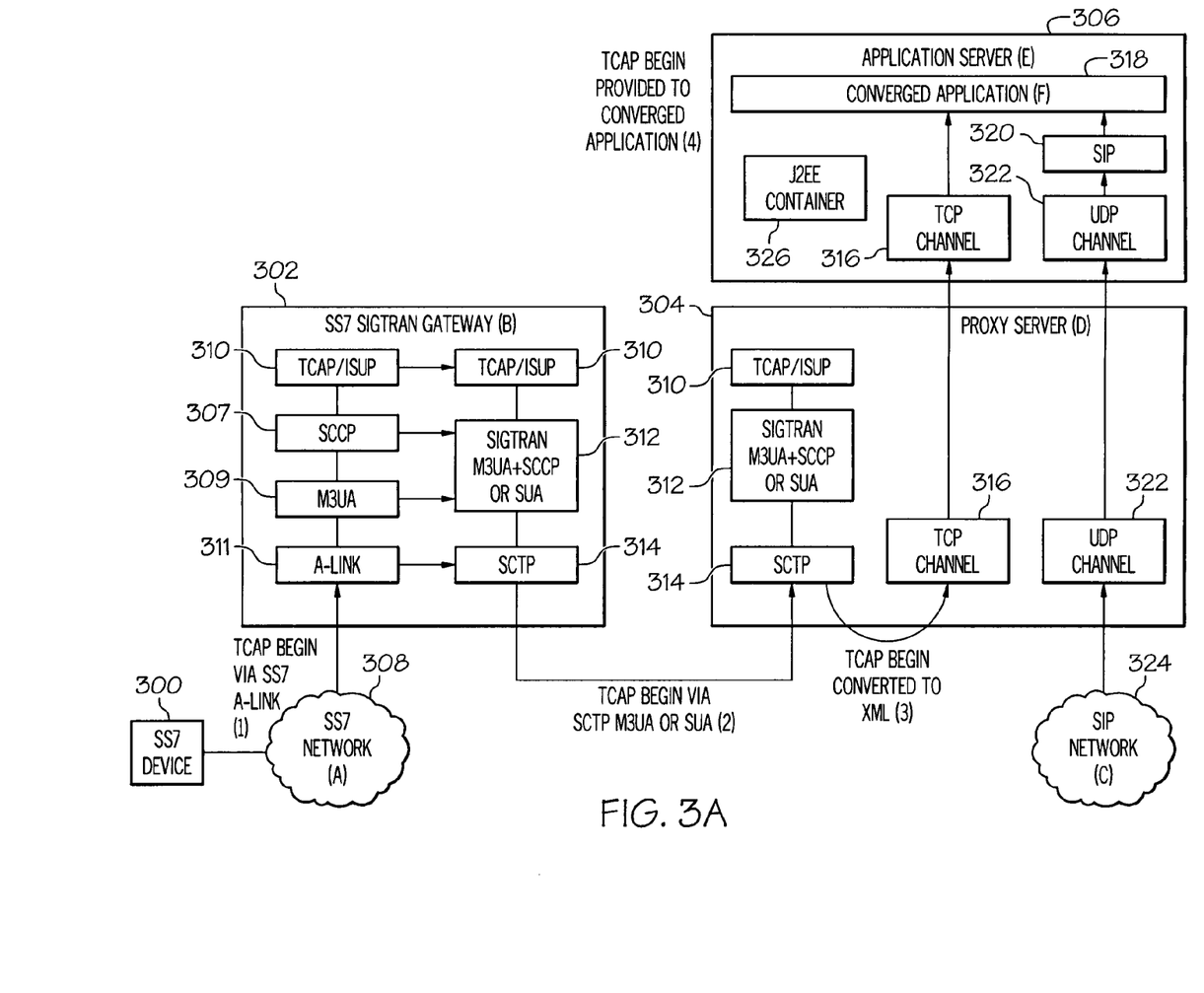
FIGS. 3*a-c* depict integrated component/process flow charts of three exemplary hardware environments and software processes used by the present invention to afford communication between a Signaling System 7 (SS7) network and an application server within a distributed service.

As described herein, the present invention provides a scalable and transparent system for enabling an application server to connect to an SS7 network. FIG. 3a depicts an integrated hardware/process overview of the present invention when used to open up a communication channel between an SS7 network/device and an application server, in order for the SS7 device to be able to access services (i.e., software applications) from the application server.

In the example shown in FIG. 3a, assume that a Signaling System 7 (SS7) device 300 (e.g., a telephone) wants to initiate a session with application server 306 via an SS7 network 308. In order to understand why such communication cannot be direct, an overview of SS7 is now presented.

Signaling System 7 (SS7)

SS7 is a defined architecture for routing telephone calls over a Public Switched Telephone Network (PSTN), such as SS7 network 308 shown in FIG. 3a. As such, SS7 provides functions and protocols for making such calls. SS7 uses an out-of-band system, in which signaling information is carried on a signaling channel and voice traffic is carried on bearer channels. Information carried on the signaling channel of an SS7 system includes the name of the caller; the destination (receiving) device; and control signals to establish dial tones, ring tones, busy signals, etc. Information carried on the bearer channels includes only the voice and data in the communication packets. Because SS7 allows a single signaling channel to service multiple bearer channels, SS7 is known as a Common Channel Signaling (CCS) system.

Within an SS7 network are Signal Switching Points (SSPs), Signal Transfer Points (STPs), and Signal Control Points (SCPs). SSPs are telephone switches that originate, terminate and locally switch calls. A common example of an SSP is a local telephone, switchboard or multi-line phone system. STPs are packet switches that receive and route signaling messages (i.e., messages that direct how a phone call should be routed) from SSPs. SCPs are databases that are used by STPs to control the routing of phone calls within an SS7 network. Typically, STPs and SCPs are redundant (i.e., a primary and at least one backup STP and SCP are provided to a particular SSP).

SS7 control signals are typically made over 56-kbps or 64-kbps bidirectional data links. Such links are known as A links, C links, E links, and F links. A links are "access" links that interconnect an STP with an SSP or a SCP. C links are "cross" links that interconnect redundant pairs of STPs. E links are "extended" links that connect a sender SSP with STPs that are associated with a receiver's SSP. F links are "fully associated" links that directly connect two SSPs.

Figure 4:
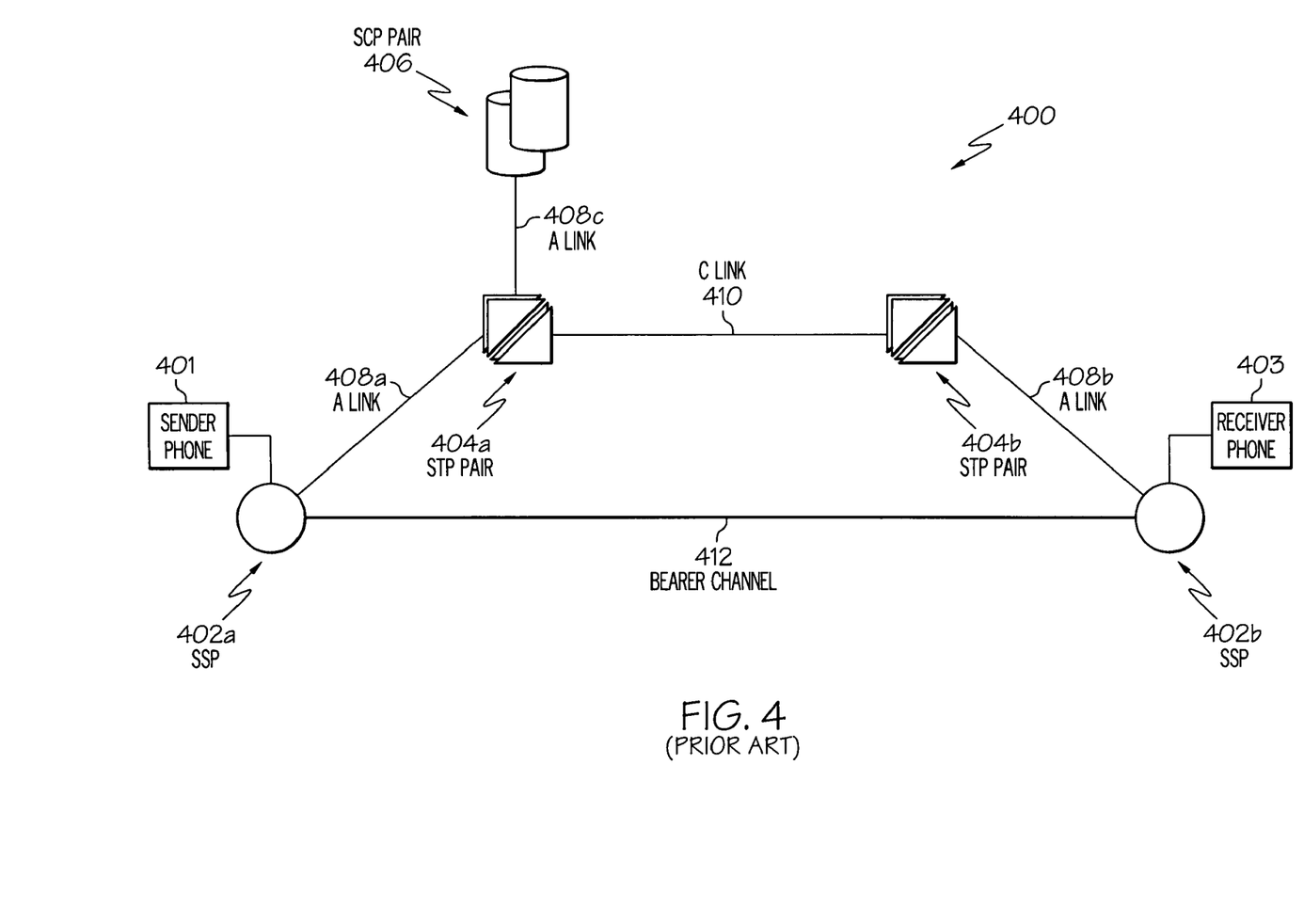
FIG. 4 illustrates a prior art SS7 network.

An exemplary prior art SS7 network 400 is presented in FIG. 4. An SSP 402a for a sender phone 401 is coupled to an STP pair 404a over an A link 408a. Similarly, SSP 402b, which supports a receiver phone 403, is coupled via an A link 408b to an STP pair 404b, which is coupled to STP pair 404a by a C link 410. Note also that STP pair 404a is coupled to an SCP pair 406 by an A link 408c. SSP 402a transmits voice/data content (i.e., messages other than control signals) to SSP 402b over a bearer channel 412, all under the control of control signals, consumed by STP pairs 404a-b, that have been furnished by SCP pair 406 and SSPs 402a-b. Thus, A links 408a-c and C link 410 make up an SS7 signal channel as described above, while bearer channel 412 is the bearer channel.

Making a phone call using SS7 involves multiple steps, which are not necessary to the understanding of the present invention. It is sufficient to understand that making a call involves a caller ("calling SSP") choosing an idle bearer channel between the caller and a receiver ("receiving SSP"), and the STPs and SCPs then controlling how the call will be initiated and eventually terminated between the caller and receiver.

It is, however, necessary to the understanding of the present invention to know that there are four layers in an SS7 protocol suite. The lowest level is the physical layer, also known as the Message Transfer Part (MTP) Level 1. This layer defines the physical and electrical characteristics of the signaling links in the SS7 network. The next higher level is the data link level, also known as MTP Level 2. This layer provides link-layer functionality by ensuring that two end points (e.g., two STPs) are error free, properly timed, etc. The next higher level is the network level, also known as MTP Level 3. This layer extends the MTP Level 2 by providing node addressing, routing, alternate routing and congestion control to ensure that messages flow smoothly and uninterrupted across an SS7 network.

The highest layer in the SS7 protocol suite is the application level, also known at the Signaling Connection Control Part (SCCP). The SCCP provides an SSP node with the ability to address applications within that SSP node. The SCCP also allows subsystems (e.g., toll free call processing, calling card processing, etc.) to be explicitly addressed for processing.

Within SCCP is an Integrated Services Digital Network (ISDN) User Part (ISUP). ISUP uses MTP Levels 1 and 2 to perform the following services. First, ISUP defines the protocol for calls being made across an SS7 network. Second, ISUP breaks down and interprets such calls, in order to properly route them to their destination. Third, ISUP manages the trunk network (e.g., different STPs) that route and manage the calls. Despite its name, ISUP is used on both ISDN and non-ISDN calls.

Also within SCCP is a Transaction Capabilities Application Part (TCAP). TCAP uses SCCP to transport TCAP messages to applications and subsystems in SS7 nodes such as STPs. TCAP is typically used to access database services used by calling cards, toll free numbers, repeat dialing, call return, etc.

One extension of the ISUP/TCAP protocols is SIGnal TRANsport (SIGTRAN). SIGTRAN is similar in functionality to ISUP/TCAP, but with the ability to use a transport called Stream Control Transmission Protocol (SCTP) as its underlying transport vehicle for transmitting signaling messages over an Internet Protocol (IP) network. However, without the present invention, SCTP does not allow signaling messages to be transmitted over a Transmission Control Protocol (TCP) channel. Thus, SCTP merely defines encapsulation methods and end-to-end protocol mechanisms for signaling messages that are transported over the IP network.

Another view of SIGTRAN is presented as 3 layers. The lowest layer is the IP layer, in which IP messages are implemented across an IP network. The next higher level is the Common Signaling Transport Protocol (CSTP) layer, which includes the SCTP discussed above. The highest layer in SIGTRAN is an adaptation layer. This layer supports specific primitives needed by various protocols, including those defined by Message Transfer Part 3 User Adaptation (M3UA) and SCCP User Adaptation (SUA). M3UA supports the transportation of SS7 signaling messages over IP using SCTP, typically between an IP node such as a Signaling Gateway (SG) and a Media Gateway Controller (MGC). SUA defines a protocol for the transport of an SS7 SCCP control signal over IP using SCTP. SUA supports the transfer of TCAP signal messages, the transfer of SCCP signal messages, and the management of SCTP messages between an SG and other IP-based signal nodes.

Referring again to FIG. 3a, recall that the example shown is for SS7 device 300 attempting to send a TCAP BEGIN message (to initialize an SS7 signal channel) to application server 306, in order to be able to access services provided by application server 306. SS7 device 300 sends a TCAP BEGIN message via an SS7 A-link 311 that is part of an SS7 SIGTRAN gateway 302. Above the A-link 311 are three depicted SS7 layers: TCAP/ISUP 310, SCCP 307, and M3UA 309, which have been discussed in technical detail above. The TCAP BEGIN message is converted into a SIGTRAN or SUA packet, using extracted SCCP and M3UA information. That is, the SCCP and M3UA protocol information used by the original TCAP BEGIN message is extracted from that message, and the TCAP BEGIN message is then re-formatted into the SIGTRAN (or SUA) protocol using a SIGTRAN/SUA stack 312. This SIGTRAN/SUA signaling message is then sent via an SCTP connection 314 to a proxy server 304.

As shown, the TCAP/ISUP layer 310 and SIGTRAN/SUA stack 312 are replicated in the proxy server 304. This allows the proxy server 304 to utilize the local SIGTRAN/SUA stack 312 to decode the TCAP BEGIN message from the SIGTRAN/SUE format into a format (e.g., Extensible Markup Language—XML) that can be easily consumed by software that is compatible with messages sent via a TCP channel 316. An exemplary software is JAVA® (JAVA is a registered trademark of Sun Microsystems, Inc. in the U.S. and other countries), which can consume the XML code that has been extracted from the SIGTRAN/SUA formatted TCAP BEGIN message. The XML code preferably contains both information from the SS7 signaling information (i.e., protocol information, source information, destination information, etc.) as well as the payload information (i.e., actual data indicating a request for service, response data, etc.) This XML code is then put onto the TCP channel 316 in the proxy server 304 for transportation to the application server 306. Since the XML code that is sent to the application server 306 has data from the original SS7 signaling information (describing where the TCAP BEGIN message originated, etc.), then responses can be generated back to the SS7 device 300 from the application server 306, using any known method for directing packets to those skilled in the art. For example, the application server 306 can initiate a process that is the reverse of that described herein for converting and transporting data from the SS7 device 300 to the application server 306. Alternatively, the application server 306 can utilize a lookup table, other conversion logic, or any known methodology for converting the signaling data back into a format that can be understood and utilized by the SS7 network 308.

Note that within the application server there is a converged application 318. Converged application 318 is a software service application. In one embodiment, converged application 318 is supported by Session Initiation Protocol (SIP) 320. Assume now that application server 306 normally communicates using SIP 320. However, in order to be able to utilize the TCP channel 316, the converged application 318 utilizes a combination of TCP, User Datagram Protocol (UDP), and SIP. Before discussing how this integration occurs, an overview of TCP, UDP and SIP is now presented.

Transmission Control Protocol—TCP

TCP is a core protocol in the Internet Protocol (IP) suite, which includes a bottom link layer, an internet layer, a transport layer, and a top application layer. TCP is part of the transport layer, and provides the protocol for delivering data from one computer to another. More specifically, TCP extracts data from a packet by stripping off networking details from a header, such as destination addresses, error checkers, control bits, echo timestamps, etc. Before sending data under TCP, a series of steps must first be taken to establish a connection between a sender and a receiver. Thus, TCP is an in-band protocol, in which signaling controls and data transmission is performed on the same channel. One major limitation of TCP is that if a data packet is lost, no subsequent data packets in a stream can be received until the lost data packet is found.

User Datagram Protocol—UDP

UDP is another protocol that is found in the transport layer of the IP suite. Unlike TCP, UDP can send packets called datagrams without first establishing a connection between the sender and the receiver. Rather, UDP uses a simple handshaking dialog between the sender and the receiver to establish contemporaneous signaling/data communication. While TCP provides error correction and lost packet tracking, UDP does not provide such features. As such, UDP is somewhat less reliable, but is much faster, due to reduced overhead.

Session Initiation Protocol—SIP

SIP is a signaling protocol found in the top application layer of the IP suite. It is typically used in the setup of video conferences, instant messaging, online games, and other applications in which real-time two-way communication is needed. It can use TCP or UDP as a transport protocol. While SIP provides many features found in SS7, SIP and SS7 are significantly different. SS7 is a centralized protocol, in which intermediate nodes (i.e., SSPs 402, STPs 404 and SCPs 406 shown in FIG. 4) are intelligent logics while the endpoints (i.e., sender phone 401 and receiver phone 403) are dumb nodes that have little, if any, logic for routing calls, etc. SIP, however, is a peer-to-peer protocol, in which endpoints are embedded with all hardware and software needed to establish connections. Thus, SIP is more scalable that SS7, but is also less controlled (and thus more vulnerable to errors and attacks). Note that SIP is not used in data transmission, but only in the signaling portion (i.e., setting up a connection) of a communication session. The data portion is typically transported, over a same channel as that used by SIP, using a Session Description Protocol (SDP) and Real-time Transport Protocol (RTP) that are also located in the top application layer of the IP suite. SDP describes which IP ports to use, which encoding/decoding hardware (coded) to use, etc. RTP is the carrier for the actual voice/data that is being transmitted.

Returning again to FIG. 3a, the non-protocol information from the TCAP BEGIN message has been decoded into XML and placed on the TCP channel 316 in the proxy server 304. By using the standard TCP channel 316, the application server 306 has the option of using the security and error-correction features of TCP as described above. However, application server 306 is not technically able to handle TCP traffic. Rather, it is only able to communicate with a SIP network 324 using a UDP channel 322, which supports a SIP channel 320. Thus, application server 306 must utilize a converged application 318.

Converged application 318 provides a hybrid application to interface with application server 306. In a preferred embodiment, this hybridization uses the signaling information from the SIP channel 320 and the extracted (XML) data from the TCP channel 316. This provides the requisite speed that is provided by the SIP channel 320, but also provides the inherent safety that the TCP channel 316 provides, as described above. That is, while the XML data that was once the SS7 TCAP BEGIN instruction is extracted from the TCP channel 316, the TCP channel 316 still provides packet checking not found in UDP or SIP.

Note that the SIP network 324 does not provide any actual data, but merely provides the signaling protocol information needed to support the UDP channel 322 and the SIP channel 320 used by the application server 306. Thus, SIP network 324 provides information to the UDP channel 322 about how the XML data from the TCP channel 316 is to be received by the application server 306. In one embodiment, this SIP-based information may also used to respond back to the SS7 device 300, such that a hybrid communication link is now established that is used to provide software services from application server 306 to SS7 device 300.

Note also that, in one embodiment, the TCAP BEGIN's XML information on the TCP channel 316 is passed into a JAVA 2 Enterprise Edition (J2EE) container 326, which is able to process the XML information.

Figure 3B:
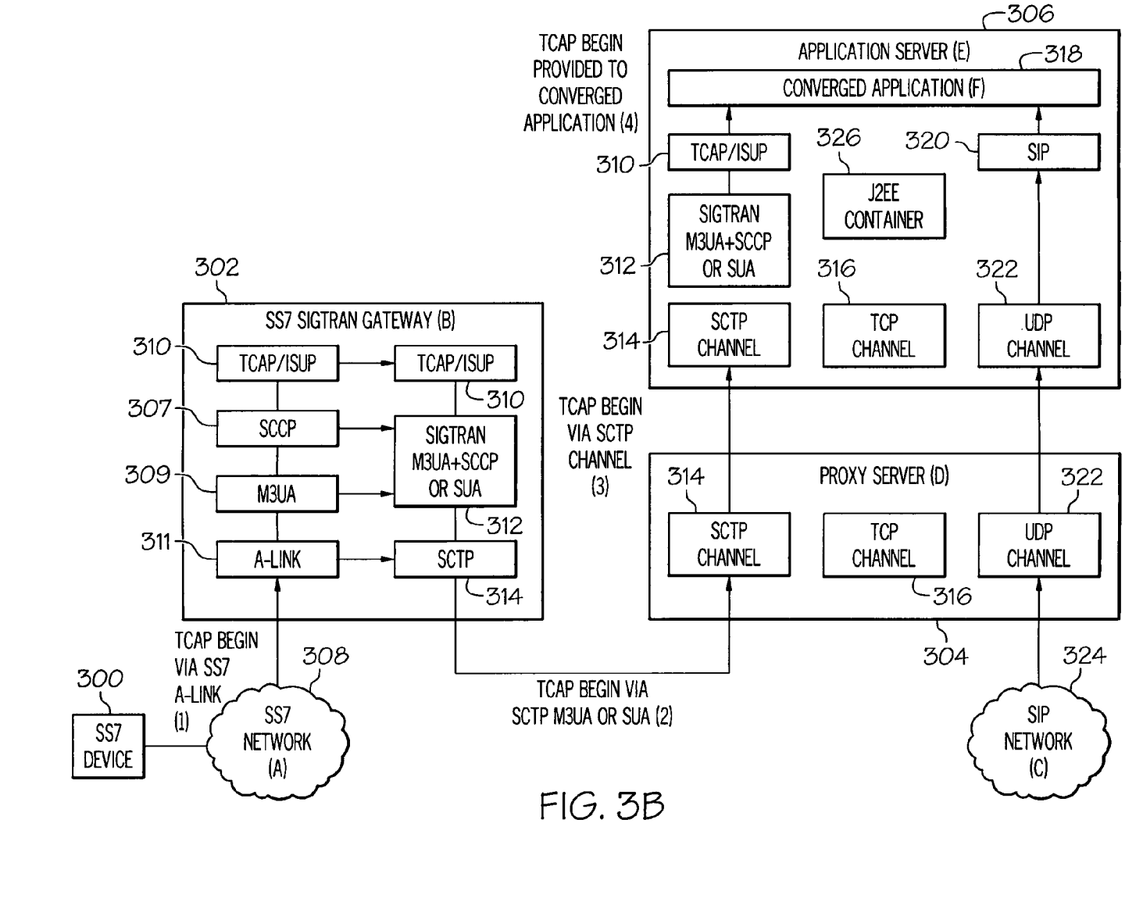

In an alternate embodiment depicted in FIG. 3b, the TCAP BEGIN message can be sent directly through the SCTP connection (channel) 314, SIGTRAN/SUA stack 312, and TCAP/ISUP 310 to the converged application 318, thus avoiding the need to convert the TCAP payload into XML as described above. As depicted, the stack of SCTP connection (channel) 314, SIGTRAN/SUA stack 312, and TCAP/ISUP 310 preferably resides within proxy server 304. The TCAP BEGIN message is sent to the SCTP channel 314 in the proxy server 304 as described in FIG. 3a. However, rather than passing the TCAP BEGIN message through the TCP channel 316, the TCAP BEGIN message passes straight through to the TACP/ISUP 310 layer, and is then converted into XML for consumption by the J2EE container 326 and the converged application 318.

Figure 3C:
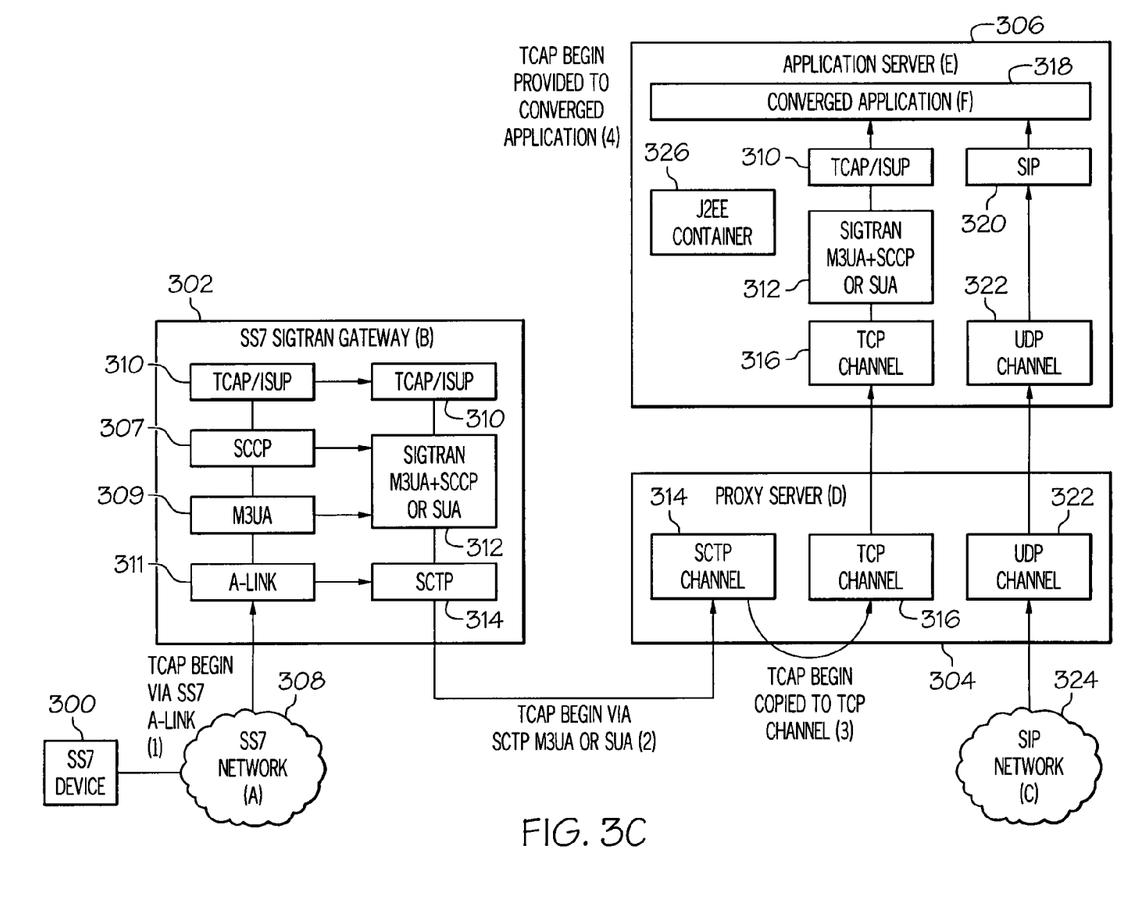

In another embodiment depicted in FIG. 3c, the TCAP BEGIN message is still transported through the TCP channel 316 as described in FIG. 3a, but now the XML conversion occurs in the application server 306. As depicted, the SIGTRAN/SUA stack 312 and the TCAP/ISUP 310 are on top of the TCP channel 316 in the application server 306, such that the TCAP/ISUP 310 directly interfaces with the converged application 318.

Figure 5:
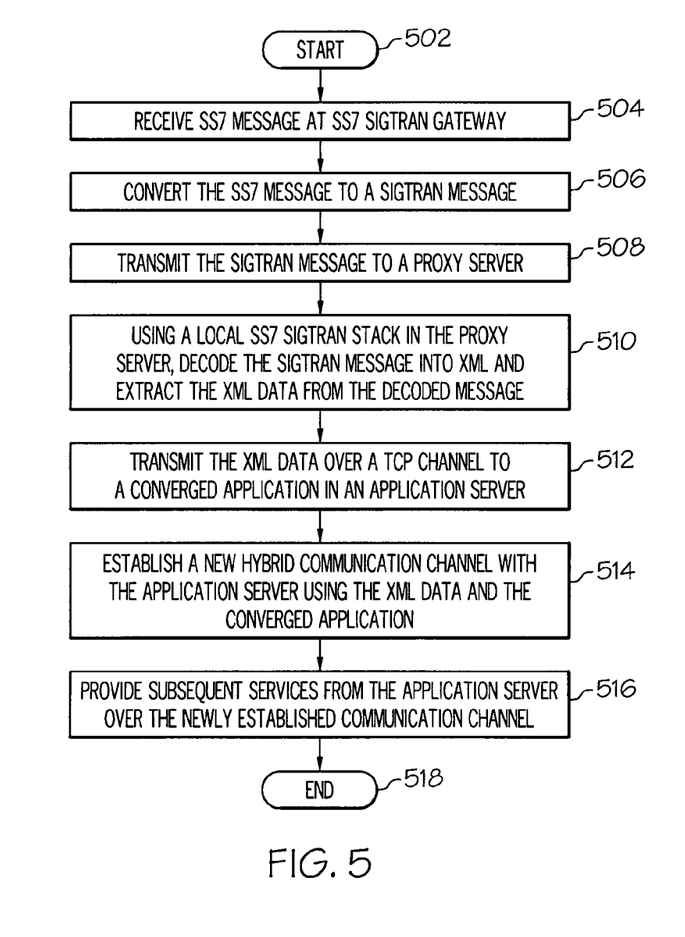
FIG. 5. is a high level flow chart of exemplary steps taken to establish a novel communication link between an SS7 device and an application server.

Referring now to FIG. 5, a high-level flow chart of exemplary steps taken to establish a communication session between an SS7 device and an SIP-configured application server is presented. After initiator block 502, which may be prompted by an SS7 device requiring a service from the SIP-based application server, an SS7 message from an SS7 device is received at an SS7 SIGTRAN gateway (block 504). Initially, this message may be a TCAP BEGIN message, as described above, which sets up an initial session. Subsequently, such messages may be any request for service from the application, using the communication channel described herein.

As described at block 506, the SS7 message is converted to a SIGTRAN message in the SS7 SIGTRAN gateway. The gateway then sends the SIGTRAN message to a proxy server (block 508). Using a local SS7 SIGTRAN stack in the proxy server, the SIGTRAN message is decoded into an XML format, which permits the XML data to be extracted from the decoded message (block 510). The XML data is then sent over a standard TCP channel to a converged application in an application server (block 512). This converged application utilizes both error-checking and security features found on the TCP channel to ensure that the XML data is accurate, but uses the SIP protocol to enable signaling for receiving and responding to the XML data. Thus, a new hybrid communication channel is ultimately established between the SS7 device and the application server (block 514). Subsequent requests for service from the SS7 device can now be presented to the application server over this new hybrid communication channel (block 516). The process ends at terminator block 518 when this new hybrid communication channel is closed.

As described herein, the present invention provides the means for an application server to connect to an SS7 network in a manner that is scalable and provides high-availability. An SS7 gateway converts SS7 TCAP/ISUP messages, normally carried on an A-link, into the SIGTRAN (M3UA or SUA) protocol carried over SCTP. The SS7 gateway then connects to a Proxy Server using SCTP. The proxy server decodes the SS7 message into a form that a platform independent language such as JAVA® (JAVA is a registered trademark of Sun Microsystems, Inc. in the U.S. and other countries), which can easily consume (using a format such as XML) and sends the message to the application server using a TCP channel. When received by the application server, the message is passed into a J2EE container for processing.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), and writable storage media (e.g., hard disk drive, read/write CD ROM, optical media). It should be understood, therefore, that such storage media when encoded with computer readable instructions that direct method functions in the present invention, represent alternative embodiments of the present invention. Further, it is understood that the present invention may be implemented by a system having means in the form of hardware, software, or a combination of software and hardware as described herein or their equivalent.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note also that while the present invention has been described according to the SS7 protocol, it is to be understood that the scope of the claims is not to be limited to version 7 of the Signaling System (SS) protocol, but is also to extend to any previous or subsequent release/version of the SS protocol for telephony. Thus, the term "SSx" as used in the appended claims is understood to represent any version of the SS protocol.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as an FPGA. Applying the VHDL instructions to the VHDL chip not only causes a physical transformation of the VHDL chip, but such VHDL instruction application can also cause a specifically loaded VHDL chip to be newly coupled (physically and/or logically) to other hardware within a computer system, thus causing an additional physical transformation of the computer system.

Having thus described the invention of the present application in detail and by reference to illustrative embodiments thereof, it will be apparent that modifications and variations are possible without departing from the scope of the invention defined in the appended claims.

What is claimed is:

1. A computer-implemented method of establishing a communication session between a Signaling System (SSx) device and an application server, the computer-implemented method comprising:
    configuring at least one specific processor to perform a process of:
    receiving, at a proxy server, a SIGnal TRANsport (SIGTRAN) message from an SSx SIGTRAN gateway, wherein the SSx SIGTRAN gateway received an SSx message from an SSx device, wherein the SSx message is a request to establish a communication link between the application server and the SSx device, and wherein the SSx SIGTRAN gateway converted the SSx message into the SIGTRAN message;
    decoding, in the proxy server, the SIGTRAN message from the SIGTRAN gateway into an Extensible Markup Language (XML) formatted packet; and
    transmitting the XML formatted packet to a converged application in the application server to establish the communication link between the SSx device and the application server.

2. The computer-implemented method of claim 1, wherein the SIGTRAN message is transmitted from the SSx SIGTRAN gateway to the proxy server via a Stream Control Transmission Protocol (SCTP) channel.

3. The computer-implemented method of claim 1, wherein the SSx message is a TCAP BEGIN message to request a start of an initial communication session between the SSx device and the application server.

4. The computer-implemented method of claim 1, wherein the XML formatted packet is transmitted from the proxy server to the application server over a standard Transmission Control Protocol (TCP) channel, and wherein the application server is a Session Initiation Protocol (SIP)-configured application server.

5. The computer-implemented method of claim 4, wherein the converged application receives data in the XML formatted packet from the standard TCP channel, wherein the converged application receives communication signaling information from an SIP channel, and wherein the standard TCP channel and the SIP channel together form a hybrid communication channel that is used to establish a communication link between the SSx device and the SIP-configured application server.

6. The computer-implemented method of claim 5, further comprising:
    transmitting subsequent requests for service from the SSx device to the application server via the hybrid communication channel.

7. A system for processing software service requests from a Signaling System (SSx) device at an application server, the system comprising:
    an SSx SIGnal TRANsport (SIGTRAN) gateway, wherein the SSx SIGTRAN gateway is configured to:
        receive an SSx message from an SSx device, wherein the SSx message is a request to establish a communication link between the SSx device and an application server;
        convert the SSx message into a SIGTRAN message; and
        transmit the SIGTRAN message;
    a proxy server, wherein the proxy server is configured to:
        receive the SIGTRAN message from the SSx SIGTRAN gateway;
        decode the SIGTRAN message into an Extensible Markup Language (XML) formatted packet; and
        transmit the XML formatted packet; and
    the application server, wherein the application server is configured to:
        receive the XML formatted packet from the proxy server, wherein the XML formatted packet is sent to a converged application in the application server to establish the communication link between the SSx device and the application server.

8. The system of claim 7, wherein the SIGTRAN message is transmitted from the SSx SIGTRAN gateway to the proxy server via a Stream Control Transmission Protocol (SCTP) channel.

9. The system of claim 7, wherein the SSx message is a TCAP BEGIN message to request a start of an initial communication session between the SSx device and the application server.

10. The system of claim 9, wherein the XML formatted packet is transmitted from the proxy server to the application server over a standard Transmission Control Protocol (TCP) channel, and wherein the application server is a Session Initiation Protocol (SIP)-configured application server.

11. The system of claim 10, wherein the converged application receives data from the XML formatted packet from the standard TCP channel, wherein the converged application receives communication signaling information from an SIP channel, and wherein the standard TCP channel and the SIP channel together form a hybrid communication channel that is used to establish a communication link between the SSx device and the SIP-configured application server.

12. The system of claim 11, wherein the SSx device subsequently transmits requests for service from the SSx device to the application server via the hybrid communication channel.

13. A hardware computer-readable storage medium on which is encoded a computer program, the computer program comprising computer executable instructions that, when executed, perform the method of:
    receiving, at a proxy server, a SIGnal TRANsport (SIGTRAN) message from an SSx SIGTRAN gateway, wherein the SSx SIGTRAN gateway received an SSx message from an SSx device, wherein the SSx message is a request to establish a communication link between the application server and the SSx device, and wherein the SSx SIGTRAN gateway converted the SSx message into the SIGTRAN message;

decoding, in the proxy server, the SIGTRAN message from the SIGTRAN gateway into an Extensible Markup Language (XML) formatted packet; and transmitting, from the proxy server, the XML formatted packet to a converged application in the application server to establish the communication link between the SSx device and the application server.

14. The hardware computer-readable storage medium of claim 13, wherein the SIGTRAN message is transmitted from the SSx SIGTRAN gateway to the proxy server via a Stream Control Transmission Protocol (SCTP) channel.

15. The hardware computer-readable storage medium of claim 13, wherein the SSx message is a TCAP BEGIN message to request a start of an initial communication session between the SSx device and the application server.

16. The hardware computer-readable storage medium of claim 15, wherein the XML formatted packet is transmitted from the proxy server to the application server over a standard Transmission Control Protocol (TCP) channel, and wherein the application server is a Session Initiation Protocol (SIP)-configured application server.

17. The hardware computer-readable storage medium of claim 16, wherein the converged application receives data from the XML formatted packet from the standard TCP channel, wherein the converged application receives communication signaling information from an SIP channel, and wherein the standard TCP channel and the SIP channel together form a hybrid communication channel that establishes a communication link between the SSx device and the SIP-configured application server.

18. The hardware computer-readable storage medium of claim 13, wherein the computer executable instructions are provided by a service provider to an execution computer in an on-demand basis.

19. A computer-implemented method of establishing a communication session between a Signaling System (SSx) device and a Session Initiation Protocol (SIP)-configured application server, the computer-implemented method comprising:

configuring at least one specific processor to perform a process of:

receiving, at an SSx SIGnal TRANsport (SIGTRAN) gateway, an SSx message from an SSx device, wherein the SSx message is a request to establish a communication link between the SSx device and a SIP-configured application server;

converting the SSx message into a SIGTRAN message in the SSx SIGTRAN gateway; and transmitting the SIGTRAN message from the SSx SIGTRAN gateway to a proxy server, wherein the proxy server is enabled to decode the SIGTRAN message into an Extensible Markup Language (XML) formatted packet, and wherein the proxy server is further enabled to transmit the XML formatted packet to a converged application in the SIP-configured application server to establish a communication link between the SSx device and the SIP-configured application server.

20. A computer-implemented method of establishing a communication session between a Signaling System (SSx) device and a Session Initiation Protocol (SIP)-configured application server, the computer-implemented method comprising:

configuring at least one specific processor to perform a process of:

receiving, at a SIP-configured application server, an Extensible Markup Language (XML) formatted packet, wherein the XML formatted packet is directed to a converged application in the application server to establish a communication link between an SSx device and the SIP-configured application server, wherein an SSx SIGnal TRANsport (SIGTRAN) gateway received an SSx message from the SSx device, wherein the SSx message is a request to establish a communication link between the SSx device the SIP-configured application server, wherein the SSx message is converted into a SIGTRAN message in the SSx SIGTRAN gateway, wherein the SIGTRAN message is transmitted from the SSx SIGTRAN gateway to a proxy server, and wherein the proxy server decodes the SIGTRAN message into the XML formatted packet.

21. A computer-implemented method of establishing a communication session between a Signaling System (SSx) device and a Session Initiation Protocol (SIP)-configured application server, the computer-implemented method comprising:

configuring at least one specific processor to perform a process of:

receiving an XML formatted packet at a converged application in a SIP-configured application server to establish a communication link between an SSx device and the SIP-configured application server, wherein an SSx SIGnal TRANsport (SIGTRAN) gateway received an SSx message from the SSx device, wherein the SSx message is a request to establish a communication link between the SSx device and the SIP-configured application server, wherein the SSx message is converted into a SIGTRAN message in the SSx SIGTRAN gateway, wherein the SIGTRAN message is transmitted from the SSx SIGTRAN gateway to a proxy server, and wherein the proxy server transmits the SIGTRAN message through a combination of a Stream Control Transmission Protocol (SCTP) channel, a SIGTRAN stack, and a Transaction Capabilities Application Part (TCAP)/Services Digital Network (ISDN) User Part (ISUP)/-TCAP/ISUP stack.

22. A computer-implemented method of establishing a communication session between a Signaling System (SSx) device and a Session Initiation Protocol (SIP)-configured application server, the computer-implemented method comprising:

configuring at least one specific processor to perform the process of:

receiving, in an SIP-configured application server, an SSx SIGnal TRANsport (SIGTRAN) message, wherein the SIGTRAN message is a request to establish a communication link between an SSx device and an SIP-configured application server, wherein the SSx message is transmitted to the proxy server after being converted into a SIGTRAN message by an SSx SIGTRAN gateway;

decoding, in the SIP-configured application server, the SIGTRAN message into an Extensible Markup Language (XML) formatted packet; and transmitting the XML formatted packet to a converged application within the application server to establish the communication link between the SSx device and the SIP-configured application server.

* * * * *